United States Patent [19]

Hooker et al.

[11] 4,386,871

[45] * Jun. 7, 1983

[54] INTERLOCKING BED FRAME MEMBERS

[75] Inventors: Richard B. Hooker, Linwood; Thomas R. Bishop, Hickory, both of N.C.

[73] Assignee: Hickory Springs Manufacturing Company, Hickory, N.C.

[*] Notice: The portion of the term of this patent subsequent to Sep. 30, 1997, has been disclaimed.

[21] Appl. No.: 112,165

[22] Filed: Jan. 14, 1980

Related U.S. Application Data

[63] Continuation-in-part of Ser. No. 900,763, Apr. 27, 1978.

[51] Int. Cl.³ .......................... B25G 3/00; F16B 7/10; F16D 1/00
[52] U.S. Cl. .................................. 403/377; 403/393; 403/363
[58] Field of Search ............. 403/353, 393, 377, 363; 24/230 BL, 230 A, 230 AL; 292/73

[56] References Cited

U.S. PATENT DOCUMENTS 4,225,265 9/1980 Hooker et al. ...................... 403/353

Primary Examiner—Wayne L. Shedd
Attorney, Agent, or Firm—Richards, Shefte & Pinckney

[57] ABSTRACT

Bed frame members are provided for quick, snap-together, interlocking assembly for preventing relative rectilinear motion between members without loose or screwthread parts. One member has a first slot with an enlarged retaining portion and a mating member has a projection thereon for entrance into the slot. The projection carries a Belleville washer having its conical convex face disposed for engagement with the slot for compression as the projection moves thereinto and for retaining engagement with the periphery of the enlarged retaining portion of the slot when the projection has been fully inserted in the slot. A second slot in one member has a portion disposed at a substantial angle to the first slot and receives a second projection disposed on the other member. When the second projection is positioned within the angularly disposed portion of the second slot, the Belleville washer may be detentedly engaged with the retaining portion of the first slot by relative rotary motion of the two members which are then locked from rectilinear motion relative to one another, and may be disengaged only by relative rotary movement to detentably disengage the retaining member from the retaining portion and from the first slot, after which rectilinear motions will disengage the second projection from the second slot. Instead of the washer, an oversized cylindrical resilient bushing may be used for deformation out-of-round when passing into the slot and detented engagement when the projection is fully inserted in the slot.

6 Claims, 22 Drawing Figures

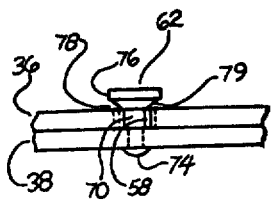 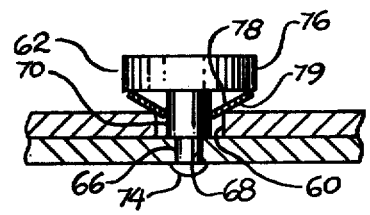
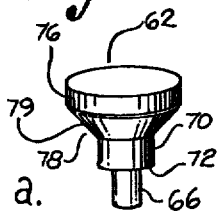 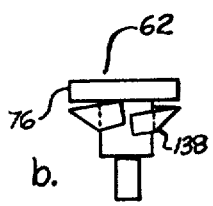 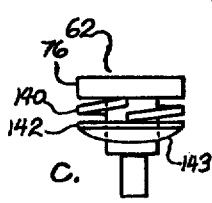 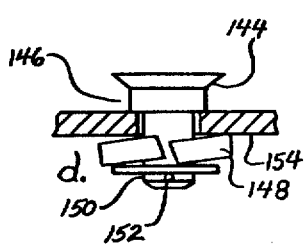
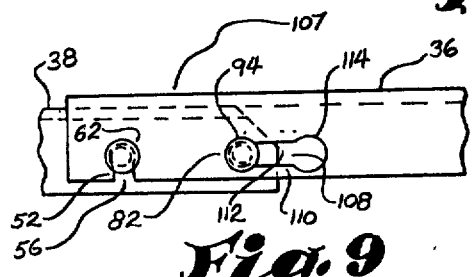 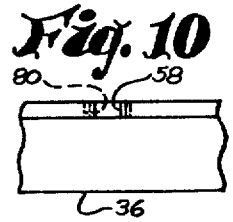
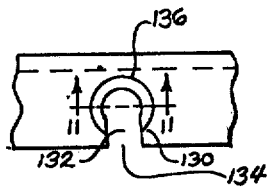 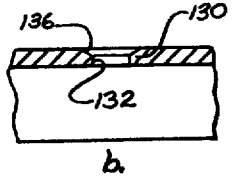
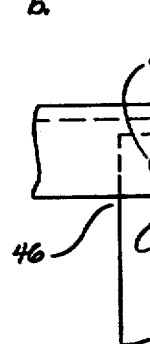

INTERLOCKING BED FRAME MEMBERS

RELATION TO OTHER APPLICATIONS

This application is a continuation-in-part of copending U.S. Patent application Ser. No. 900,763, filed on Apr. 27, 1978.

BACKGROUND OF THE INVENTION

Hollywood bed frames are commonly made with angle iron frame members which may be folded and/or disassembled for shipping or moving and which are adjustably assemblable to accommodate different sizes of mattresses. Such frames may be provided with center support rail members stretching between the cross rails for better support of King-size mattresses. It is desirable for assembly, disassembly, and adjustment purposes that the frame members be readily but firmly attached to one another, but without the use of loose nuts, bolts, clamps, clamp screws, or other elements, and without the use of tools.

Prior efforts to provide interlocking joints for such bed frames are best exemplified in the U.S. Pat. Nos. 3,775,783 3,736,602; and 3,824,638.

U.S. Pat. No. 3,755,783 discloses assembly joints for bed frame members having pairs of L-shaped slots opening to the edges of the members for engagement with pairs of projections on mating members, and these joints are assembled and disassembled by simple rectilinear motions of the mating joint members laterally and longitudinally relative to one another. U.S. Pat. No. 3,737,602 discloses assembly joints for bedframe members having pairs of slots disposed in mutual angular relation to one another for engagement with pairs of projections on mating members, and the joints are assembled and disassembled by a combination of a relative rectilinear motion between joint elements generally parallel to one of the slots to engage one mating projection therewith, followed by a relative rotary motion between elements to engage the other slot and projection. U.S. Pat. No. 3,824,638 discloses assembly joints for bed frame members having L-shaped and straight slots adjacent one another, similar to those of the present invention, for assembly by rectilinear relative motions of the joint members parallel to the two legs of the L-slot followed by relative rotary motion between the members, to engage a projection in each of the slots.

Various combinations of slots and projections have been provided in bed frame members for interlocking assembly, by the above-mentioned patents and others not so relevant, but none have provided the yieldable, snap-action retaining features of the present invention which ensure that any disassembly of the members will be purposeful and not accidental.

SUMMARY OF THE INVENTION

Briefly described, the present invention provides an interlocking joint for snap-together assembly of first and second members of a metal bed frame and the like for assembly by complex motions which cannot be undone by simple rectilinear motions of one member relative to the other. The joint includes a first frame member having a first projection thereon having a body adjacent the member, and a second frame member with a first projection receiving slot formed therein. This first slot has an entry portion for entry of the first projection into the first slot, a communicating portion extending from the entry portion, and a projection retaining portion spaced away from the entry portion. The projection retaining portion is larger than the communicating portion, and is connected to the entry portion by the communicating portion. A resilient retaining means is associated with the first projection for engaging the periphery of the retaining portion for releasably retaining the projection in the enlarged retaining portion of the first slot.

Preferably, the resilient retaining means is disposed for resiliently compressible movement into the enlarged retaining portion for releasably preventing passage of the projection therefrom into the communicating portion, and for initial movement to permit entry of the projection into the first slot and subsequent removal from the retaining portion. Preferably the retaining means includes a contacting portion having a generally convex shape disposed toward the first frame member for engaging the periphery of and for seating the retaining means in the retaining portion of the first slot, and the retaining means is resiliently biased toward the first frame member. The entry portion of the first slot is preferably disposed at an edge of the second frame member.

In the preferred embodiment of the joint, the retaining means includes a spring washer and the first projection has an enlarged head spaced from the first frame member to form a stop for compression of the washer thereagainst, which washer may be a Belleville spring washer.

In other preferred embodiments, the entry portion of the first slot comprises an intersection of the slot with an admitting enlargement of the slot of size suitable to allow passage therethrough of the retaining means, and the projection retaining portion of the first slot may include a countersink providing a seat for the retaining means.

Yet another preferred embodiment includes an oversized resilient bushing instead of a Belleville washer, which bushing is mounted on the body of the first projection and forming part of the retaining means, the bushing having a generally cylindrical shape with an outside diameter greater than the width of the communicating portion of the first projection receiving slot for releasably retaining the first projection in the enlarged retaining portion of the first slot. The resiliency and size of the bushing and the size of the body of the first projection permit sufficient deformation of the bushing for forced passage of the bushing mounted on the first projection through the communicating portion of the first projection receiving slot, and the first projection has an enlarged head spaced away from the first frame member on the body of the first projection for retaining the bushing on the body.

The joint also includes a second projection on one of the frame members spaced from the location of the engaging of the retaining means and the retaining portion of the first slot. This second projection has a body adjacent its associated frame member and an enlarged head spaced therefrom for admittance of the other of the frame members therebetween. A second projection receiving slot in the other of the frame members receives the second projection and is disposed to retain it therein when the first projection is retained in the first slot retaining portion.

Preferably, the second slot has an entry portion thereof for entry of the second projection thereinto to dispose the second slot between the head of the second projection and its associated frame member, and has a portion connected to the entry portion and extending at a substantial angle to the extent of the first projection receiving slot for reception of the second projection when the first projection is retained in the retaining portion of the first slot by the retaining means.

In the preferred embodiment of the joint the entry portion of the second slot is disposed in the other frame member spaced away from the entry portion of the first slot at a different spacing from that between the first projection and the second projection when the first projection is retained in the retaining portion of the first slot by the retaining means.

Other embodiments of the joint may have a common entry portion for the first slot and the second slot, and the entry portion for the second slot may comprise an intersection of the second slot with an admitting enlargement thereof of size suitable to allow passage therethrough of the enlarged head of the second projection.

BRIEF DESCRIPTION OF THE DRAWINGS

FIG. 6 is an enlarged view of the joint of FIG. 4 as viewed along line 6—6 of FIG. 5, showing the projection within the communicating portion of the slot and the washer compressed accordingly;

FIG. 7 is an enlarged cross-sectional view of the joint of FIG. 4 taken along line 7—7 of FIG. 4 with the projection and Belleville washer in the enlarged retaining portion of the slot;

FIG. 8a is an enlarged perspective view of a shouldered rivet and Belleville washer retaining means ready for attachment to an interlocking joint member, and FIGS. 8b–d are enlarged elevational views of alternative retaining means embodiments;

FIG. 9 is a view similar to FIG. 4 showing an alternative second slot configuration;

FIG. 10 is a bottom view of the slot of FIG. 2 as viewed along the line 10—10 of FIG. 2;

FIG. 11a and b are foot-end elevational and horizontal cross-sectional views, respectively, of an alternative embodiment of the slot of FIG. 2;

FIG. 12 is a plan view of the interlocking joint between the center support rail and the head end cross rail of the frame of FIG. 1;

DESCRIPTION OF THE PREFERRED EMBODIMENTS

Figure 1:
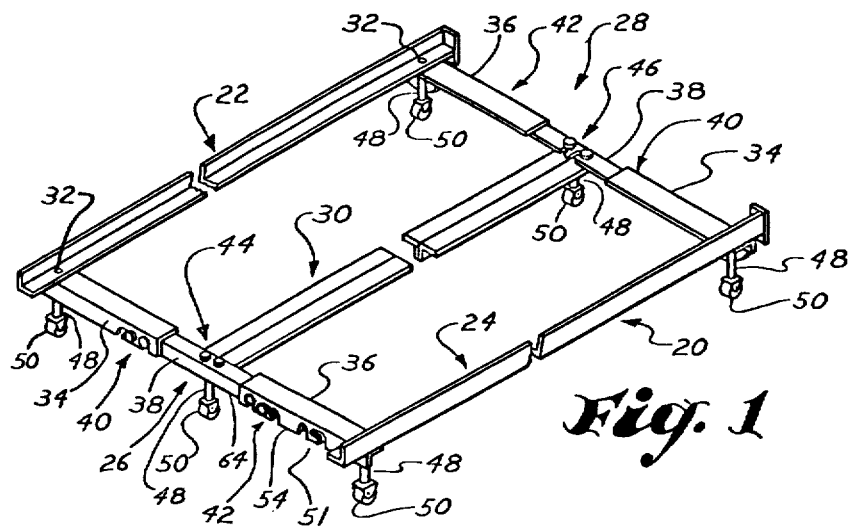
FIG. 1 is A perspective view from the foot end of a Hollywood bed frame including several of the preferred embodiments of the present invention.

Preferred embodiments of the interlocking bed frame members according to the present invention are shown in FIG. 1 as used in a typical Hollywood bed frame 20 having a pair of side rails 22, 24, a pair of cross rail assemblies 26, 28, and a center support rail 30, these members all formed basically from angle iron. The side rails 22, 24 are commonly connected to the cross rail assemblies 26, 28 by rivets 32 which allow the short end members 34, 36 of the cross rail assemblies 26, 28 to pivot in against the side rails 22, 24 for space-saving packaging or transport when disassembled from the mid-portions 38 of the cross rail assemblies 26, 28.

Interlocking joints 40, 42 constructed according to the preferred embodiments of the present invention as hereinafter described allow ready assembly and disassembly of the end members 34, 36 and the mid-portions 38. Center support interlocking joints 44, 46 similarly allow ready assembly and disassembly of the mid-portions 38 and the center support rail 30. Typically, the side rails 22, 24 and the center support rail 30 each have downwardly extending legs 48 attached thereto near the ends thereof for supporting the bed frame 20 above a floor, and the casters 50 are attached to the lower ends of the legs 48 to contact the floor for easy movement of the frame 20 thereon.

For simplicity of disclosure, the single bed frame of FIG. 1 is shown with various interlocking arrangements according to different embodiments of the present invention incorporated in the single bed frame. It should be recognized that the present invention encompasses the use of only one of the joints on a bed frame as well as the use of more than one of each kind or different kinds on the same bed frame.

Figure 2:
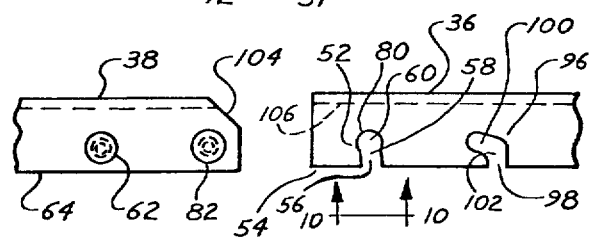
FIG. 2 is an enlarged foot-end elevational view of the adjacent portions of the separated bed frame members forming the nearest interlocking joint of FIG. 1.

The interlocking joint 42 of the present invention in the form shown nearest the viewer in FIG. 2 is formed by mating projections from, and slots in, the mid-portion 38 and the short end member 36, respectively, of the cross rail assembly 26. Additional sets of slots as indicated by the numeral 51 in FIG. 1, at suitable spacings along the end members, are provided for adjustment of the bed frame to selected widths.

The angle iron short end member 36 has a "doll's head" first slot 52 formed vertically in the vertical flange 54 thereof near the free end thereof. The slot 52 intersects with the outside edge of the flange 54 thereby forming an entry portion 56 of the slot 52 at the intersection, and extends inwardly of the flange 54 therefrom forming a connecting and communicating portion 58 of the slot 52 from the entry 56 to an enlarged retaining portion 60 thereof typically of circular form larger than the communicating portion thereof and resembling a doll's head in silhouette. The angle iron mid-portion 38 of the cross rail assembly 26 has a first projection 62 thereon in the form of a shouldered rivet, as shown in FIG. 7, whose riveting shank 66 extends from the outside of the mid-portion 38 through the vertical flange 64 thereof by means of a clearance hole 68 therein located at a suitable distance from the right end thereof as explained hereinafter. The projection or rivet 62 has a body 70 whose diameter is sized for clearance within the communicating portion 58 of the slot 52, and a shoulder 72, part of the body 70 and disposed adjacent the flange 64, where the body 70 is necked down to form the riveting shank 66. The shoulder 72 is conventionally clinched tight against the outside of the midportion 38 by swaging a head 74 on the extending end of the riveting shank 66 on the inside of the midportion 38, at the same time expanding the shank 66 to a metal-to-metal fit inside the hole 68 to make the projection 62 essentially a permanent part of the midportion 38. A conventional rivet head 76 is provided at the projecting end of the body 70 and spaced from the flange 64 to retain a Belleville spring washer 78 mounted on the body 70 with its generally convex- or conical-shaped contacting portion 79 disposed toward the flange 64.

The head 76 is spaced from the flange 64 suitably to form a stop for the Belleville washer 78 on the body 70 so that when the body 70 of the projection 62 enters, or is received, within the slot 52, with the slot 52 disposed between the head 76 and the flange 64, the Belleville washer 78 will form a resiliently movable or compressibly resilient retaining means for engaging between the rivet head 76 and the periphery 80 of the enlarged retaining portion 60 of the slot 52 in a partially compressed condition, being compressibly expandable for seating movement into the retaining portion 60 for releasably preventing passage of the projection 62 from the enlarged portion 60 into the communicating portion 58 of the slot 52. Inherently, the well-known cross-sectional shape of the washer 78, as shown in FIG. 7, provides means disposed between the head 76 of the projection 62 and the contacting portion 79 of the washer 78 for compressible resilient biasing of the contacting portion 79 toward the end member 36. However, suitable force applied along the extent of the slot 52 will further compress the Belleville washer 78 against the head 76 to allow the projection 62 to move out of the retaining portion 60 into the communicating portion 58 and therethrough to and past the entry portion 56 for removal of the projection 62 from the slot 52. Reverse movement will cause like compression of the washer 78 to permit the projection 62 to enter the slot 52 and move therethrough to the retaining portion 60 for "snap-together" engagement for retention therein and removal therefrom.

Figure 3:
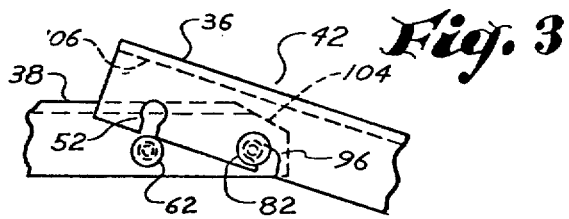
FIG. 3 is a view similar to FIG. 2, showing the joint at an intermediate step of assembly.
Figure 4:
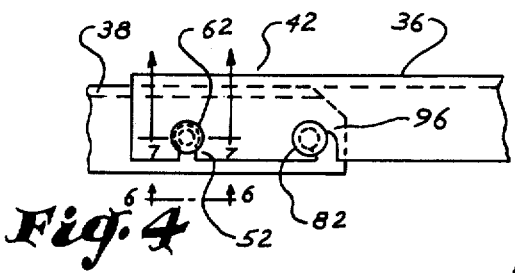
FIG. 4 is a view similar to FIG. 2, showing the completely assembled joint.
Figure 5:
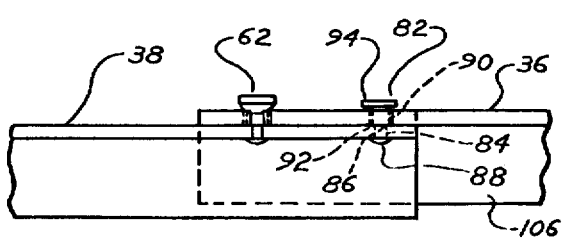
FIG. 5 is a bottom view of the joint of FIG. 4.

In the preferred embodiment of the present invention as shown in FIGS. 3–5, the just-described projection and slot and retaining elements are combined with another projection and slot similar to those disclosed in the center support rail interlocking joint of the aforementioned U.S. Pat. No. 3,824,638. A second projection or rivet 82 has its riveting shank 84 extended through a clearance hole 86 in the vertical flange 64 of the midportion 38. This projection 82 is spaced away from the first projection 62 and the location of the engaging of the retaining means 78 and the retaining portion 60 toward and near the right end of, and lengthwise of, the midportion 38. The projection 82 has its shank 84 riveted to form a head 88 thereon, thereby fixing the body 90 of the projection 82 tight against its shoulder 92 and against and adjacent to the outside of the flange 64.

The enlarged head 94 on the body 90 of the projection 82 is spaced from the flange 64 for admittance of the vertical flange 54 of the short end member 36 therebetween. An L-shaped second slot 96 is formed in the flange 54 for receiving the body 90 of the projection 82 therein, one leg of the slot 96 being disposed to communicate and intersect with the outside edge of the flange 54 to form an entry portion 98 of the slot 96 for entry of the projection 82 thereinto to dispose the slot 96 between the enlarged head 94 and the flange 54 of the end member 36.

An angular portion 100 forming the other leg of the L-shaped second slot 96 extends at a substantial angle to the extent of the doll's head first slot 52 and is connected to the entry portion 98 of the slot 96 by the connecting portion 102 thereof for reception of the body 90 of the projection 82 for retention therein during the engaging of the retaining portion 60 of the slot 52 by the retaining means formed by the Belleville washer 78, i.e. when the first projection 62 is retained in the first slot retaining portion 60. The connecting portion 102 is disposed generally parallel to the communicating portion 58 of the doll's head slot 52.

The entry portion 98 of the slot 96 is spaced from the retaining portion 60 and the entry portion 56 of the slot 52 (and thereby from the location of the engaging of the retaining means or Belleville washer 78 and the retaining portion 60 during such engagement) at a different spacing from that between the first projection 62 and the second projection 82 when the first projection 62 is retained in the first slot retaining portion 60 by the retaining means 78.

As shown in FIG. 3, the interlocking joint 42 is assembled manually by slipping the body 90 of the projection 82 into the L-shaped slot 96 to the vicinity of the blind end of the angular portion 100 thereof (the angled-off corner 104 of the midportion 38 may be provided for clearance with the horizontal flange 106 of the short end member 36 during this assembly), and then slipping the body 70 of the projection 62 into the doll's head slot 52 until the Belleville washer 78 engages the retaining portion 60 thereof as shown in FIGS. 4 and 5. The extent of the communicating portion 58 of the slot 52 may be angled about 5° from perpendicularity to the outside edge of the flange 54 so that is approximates a segment of an imaginary arcuate slot centered at the blind end of the angular portion 100 of the slot 96. The extent of the angular portion 100 may be angled about 15° to the extent of the end member 36.

The engagement of the flange 106 at the left end thereof on top of the midportion 38 combined with the engagement of the projection 82 in the L-shaped slot 96 then locks the cross rail assembly 26 in straight disposition against the weight of the bedding or beings placed thereon while the engagement of the projection 62 in the doll's head slot 52 locks the cross rail assembly 26 from endwise telescoping movement. The size of the joint members, or projections, and the spacing between projections are all chosen so that the joint elements will not be deformed by normal weights or loads carried thereby. Thus the joint 42, once assembled, can only be disassembled by lifting up on the cross rail assembly to pivot the joint members about the projection 82 as shown in FIG. 3, and the detenting or retaining action of the retaining Belleville washer 78 in the retaining portion 60 of the doll's head slot assures that any such disassembly must be purposeful and not accidental.

Other embodiments of the present invention may be preferred for various reasons. In this regard, FIG. 9 shows an embodiment of an alternative interlocking joint 107 according to the present invention in which the entry portion 108 of a keyhole-shaped second slot 110 is formed by the intersection of its angular portion 112 with an admitting enlargement 114 thereof suitable to allow the passage of the enlarged head 94 of the second projection 82 therethrough. Thereafter, assembly of this joint 107 would proceed as previously described for the interlocking joint 42. The joint 107 may be substituted for the joint 42 and provides a stronger short end member 26 since there is no opening in the bottom edge of the vertical flange 54 thereof.

It is apparent that the interlocking joint 40 is merely an opposite hand version of the joint 42, and, of course, all the joints disclosed herein are subject to similar rearrangement.

Figure 14:
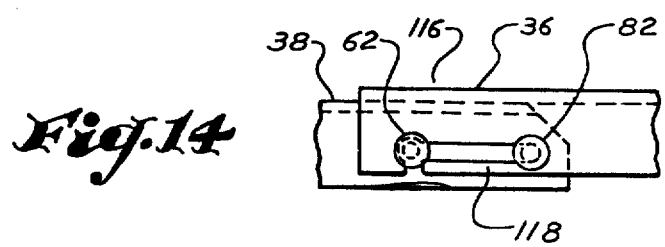
FIG. 14 is a view similar to FIG. 4 of an alternative embodiment of the joint thereof.
Figure 15:
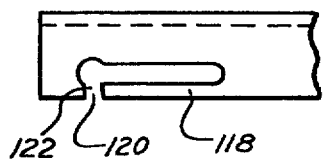
FIG. 15 is an elevational view of the slotted member of the joint of FIG. 14.
Figure 16:
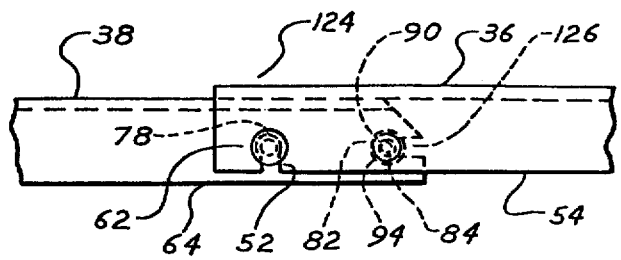
FIG. 16 is a view similar to FIG. 4 of another alternative embodiment of the joint thereof.

Similarly, the embodiment shown in FIGS. 14 and 15 discloses a second alternative interlocking joint 116 wherein the doll's head slot and the L-shaped second slot are combined to form a composite "bird-billed" slot 118 in which a single common entry portion 120 serves a single common communicating portion 122 to admit both projections 62 and 82 suitably to the slot 118.

Where adjustment to more than one bedding width is not required perhaps the strongest and most economical embodiment of the invention is disclosed in FIG. 16, wherein a third alternative interlocking joint 124 is shown with its first projection 62 in its previously disclosed disposition on the midportion 38, as is the doll's head slot 52 on the end member 36; but the second projection 82 has its shank 84 riveted to the vertical flange 54 of the end member 36 with its body 90 and head 94 extending rearwardly therefrom. The projection 82 is located at a suitable distance to the right along the end member 36 from the slot 52 to mate with a straight second slot 126 opening to the right end edge of the vertical flange 64 of the midportion 38 and disposed at a substantial angle to the doll's head slot 52 during completed assembly of the joint. Assembly of the joint is accomplished essentially as explained hereinbefore, with the second projection 82 first slipped into the second slot 126 with the end member 36 angularly disposed to the midportion 38, and then the first projection 62 slipped into the doll's head slot 52 by conterclockwise rotation of the end member 36 about the projection 82 to the interlocking parallel engagement position with the midportion 38 as shown in FIG. 16.

A fourth alternative interlocking joint 46 is disclosed in FIG. 12, where the disposition of slots and projections is similar to that disclosed in the center rail support interlocking joint of the aforementioned U.S. Pat. No. 3,824,638, but the doll's head slot 52 in the midportion 38 and the Belleville washer 78 on the first projection 62 from the center support rail 30 have been introduced as components of the present invention. Construction and assembly of this center support rail interlocking joint 46 are obviously generally those of the joint 42 shown in FIG. 4.

Figure 13:
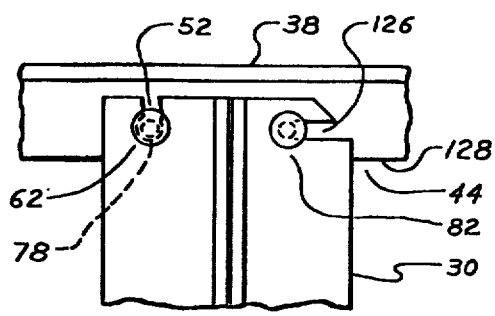
FIG. 13 is a bottom view of an alternative interlocking joint as used between the center support rail and the foot-end cross rail of the frame of FIG. 1.

Another embodiment of the invention is disclosed by the center support rail interlocking joint 44 shown in FIG. 13, where the first and second projections 62 and 82 are riveted to the midportion 38 with their bodies and heads on the underside of the horizontal flange 128 thereof, so that the midportion 38 is not weakened by slots in the central portion thereof. The doll's head first slot 52 opens to the end edge of the center support rail 30, while the straight second slot 126 opens to the side edge of the center support rail 30, with suitable spacings between projections and slots as explained hereinbefore for the same purpose of interlocking assembly to prevent shifting of the midportion 38 either laterally or lengthwise thereof with respect to the center support rail 30. Deliberate disassembly is possible, but only after overcoming the detenting engagement of the Belleville washer 78 carried on the projection 62 with the doll's head slot 52 by rotating the support rail 30 counterclockwise with respect to the midportion 38. This embodiment has the additional advantage that the slots, projection heads, and Belleville washer are all concealed and protected beneath the midportion 38 where bedclothes will not catch on them.

A further alternative embodiment of the doll's head slot 52 as shown in FIGS. 2 and 10 may take a form such as that shown in FIG. 11a and b, where the modified doll's head slot 130 includes a plain slot 132, an entry portion 134 where the slot 132 intersects the outside edge of an angle iron member, and a countersink forming an enlarged retaining portion 136 generally concentric to the slot 132 widthwise thereof and providing a seat for engagement with a retaining means such as a Belleville washer 78. Other embodiments of the doll's head slot are possible, such as the use of an admitting enlargement similar to the enlargement 114 of the keyhole slot 110 to allow passage therethrough of the retaining means to permit entry of the first projection into the doll's head slot.

The resilient movable or compressibly resilient retaining means formed by the Belleville washer 78 has a contacting portion 79 of conical shape but may alternatively be formed by other devices including contacting portions having generally convex shapes disposed toward the doll's head slot for engaging the periphery of the enlarged retaining portion 60 thereof and means for resilient biasing of the contacting portions toward the portion 60 as shown in FIG. 11b–d. A split helical, generally conical-faced washer 138 may be compressed axially between a first slot and the head 76 of the projection 62, a split helical washer or spring 140 behind a washer 142 with a contacting portion 143 having a generally convex shape may be used likewise, or a countersunk-type head 144 on a shouldered pin 146 may be biased into retaining engagement with a doll's head slot by a spring or split washer 148 disposed on the projection shank 150 of the pin 146 between a crosspin 152 therein and the back side of the projection-carrying member 154.

Figure 17:
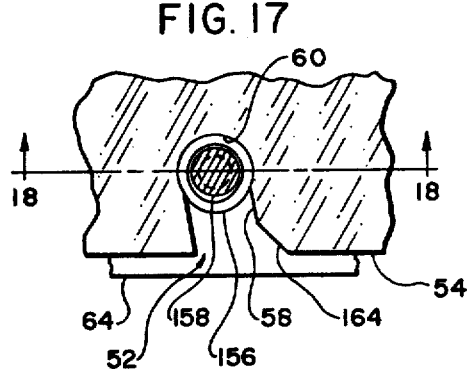
FIG. 17 is a plan view similar to the left portion of FIG. 4, partially cut away to show a resilient bushing on a shouldered rivet in an alternative interlocking joint.
Figure 19:
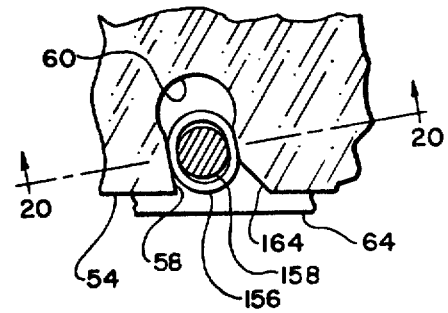
FIG. 19 is a plan view of the joint of FIG. 17 showing the projection within the communicating portion of the slot and the bushing compressed accordingly.
Figure 18:
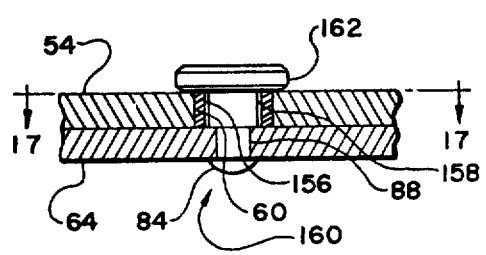
FIG. 18 is a cross-sectional view of the joint of FIG. 17 taken along the line 18—18 thereof.
Figure 20:
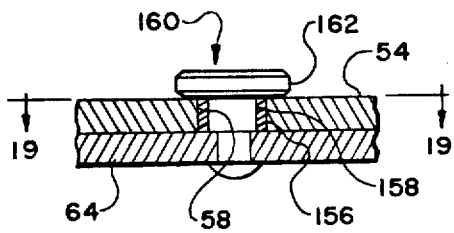
FIG. 20 is a cross-sectional view of the joint of FIG. 19 taken along the line 20—20 thereof.
Figure 21:
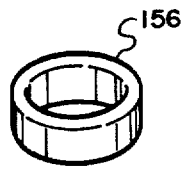
FIG. 21 is an enlarged perspective view of the bushing of FIGS. 17-20.

Alternatively, the resilient moveable or compressibly resilient retaining means may be a resilient generally cylindrical bushing 156 (as shown in FIGS. 12–21) mounted on the body 158 of an alternative first projection 160 from the flange 64. The outside diameter of the bushing 156 may typically be 0.375 inches, the inside diameter 0.325 inches, and the diameter of the body 158 may typically be about 0.280 inches, whereby the bushing 156 is oversized and may be squeezed or deformed out-of-round (as shown in FIGS. 19 and 20) over the body 158 sufficiently for permitting its forced passage through the communicating portion 58 (typically 0.340 inches wide) of a first projection receiving doll's head slot 52 in the flange 54 having an enlarged retaining portion 60 typically of about 0.360 inches diameter. The bushing 156 reverts resiliently toward its normal cylindrical shape when forced into the enlarged retaining portion 60 as shown in FIGS. 17 and 18, so that the bushing 156 releasably or detentingly retains the projection 160 within the retaining portion 60 of the slot 52 until forced back through the communicating portion 58 of the slot 52. The bushing may typically be formed from a plastic material such as nylon, polyester with glass fiber, or other suitable materials.

The projection 160 has a conventional rivet head 162 provided at the projecting end of the body 158 for freely retaining the bushing 156 thereon, for admitting the flange 54 between the head 162 and the flange 64, and for preventing significant flatwise separation of the flanges 54 and 64. The length of the bushing 156 is about the same as the thickness of the flange 54. An angled entry enlargement 164 of the slot 52 facilitates assembly of the oversized bushing 156 into the communicating portion 58 of the slot 52.

Figure 22:
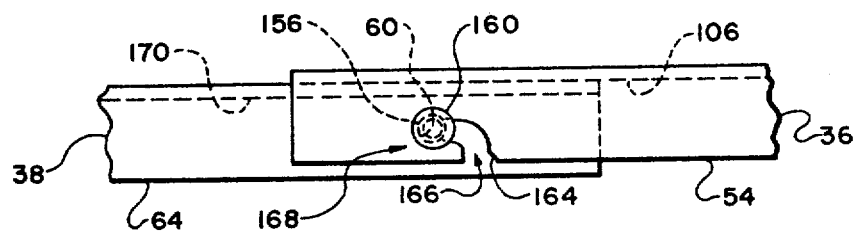
FIG. 22 is a view similar to FIG. 4 showing a single-slot embodiment of the invention.

The bushing 156 may alternatively be used with the slot alternatives as shown in FIGS. 9, 12, 13, 14, and 16, or with a single projection 160 from a flange 64 and a single doll's head L-shaped slot 166 in a flange 54 to provide a suitably rigid self-interlocking joint 168, as shown in FIG. 22, where the horizontal flanges 106 and 170 of the rail portions 36 and 38 respectively become a functioning part of the joint 166, the rigidity being dependent on suitably spacing the projection 160 and the slot 166 from the respective lengthwise extremities of the rail portions 38 and 36. The alternative resilient retaining means of FIG. 8 might also be used with the slot 166.

While a number of alternative preferred embodiments have been disclosed above and illustrated in the drawings for disclosure purposes only, the possibilities of other constructions within the scope of this invention are by no means exhausted, and the disclosure herein is not intended to limit the scope of the present invention, which is to be determined by the scope of the appended claims.

We claim:

1. An interlocking joint for snap-together assembly of first and second members of a metal bed frame and the like comprising:
    (a) a first projection on said first frame member having a body adjacent said first member;
    (b) a first projection receiving slot formed in said second frame member, said first slot having an entry portion for entry of said first projection into said slot, a communicating portion extending from said entry portion, and a projection retaining portion spaced away from said entry portion, said projection retaining portion being larger than said communicating portion, and connected to said entry portion by said communicating portion; and
    (c) resilient retaining means associated with said first projection for engaging the periphery of said retaining portion for releasably retaining said first projection in said enlarged retaining portion of said first slot, said retaining means comprising a resilient bushing mounted on said body of said first projection.

2. An interlocking joint according to claim 1 and characterized further in that said bushing has a generally cylindrical shape with an outside diameter greater than the width of said communicating portion of said first projection receiving slot for said releasably retaining said first projection in said enlarged retaining portion of said first slot.

3. An interlocking joint according to claim 2 and characterized further in that the resiliency and size of said bushing and the size of said body of said first projection permit sufficient deformation of said bushing for forced passage of said bushing mounted on said first projection through said communicating portion of said first projection receiving slot.

4. An interlocking joint according to claim 1 and characterized further in that said first projection has an enlarged head spaced away from said first member on said body for retaining said bushing on said body.

5. An interlocking joint according to claim 1 and characterized further in that said resilient retaining means is disposed for resiliently compressible movement into said enlarged retaining portion for releasably preventing passage of said first projection therefrom into said communicating portion, and for further movement to permit said entry into said first slot and removal from said retaining portion thereof.

6. An interlocking joint according to claim 1 and characterized further in that said retaining means comprises a contacting portion having a generally convex shape disposed toward said first member for engaging said periphery and for seating said retaining means in said retaining portion, said retaining means being resiliently biased toward said first member.

* * * * *